(12) United States Patent
Cardinal et al.

(10) Patent No.: US 8,427,118 B2
(45) Date of Patent: Apr. 23, 2013

(54) SYSTEMS AND METHODS FOR REGULATING POWER IN RENEWABLE ENERGY SOURCES

(75) Inventors: Mark Edward Cardinal, Schenectady, NY (US); Jignesh Govindlal Gandhi, Simpsonville, SC (US); Andreas Kirchner, Salzbergen (DE)

(73) Assignee: General Electric Company, Schenectady, NY (US)

( * ) Notice: Subject to any disclaimer, the term of this patent is extended or adjusted under 35 U.S.C. 154(b) by 791 days.

(21) Appl. No.: 12/606,074

(22) Filed: Oct. 26, 2009

(65) Prior Publication Data
US 2011/0095609 A1 Apr. 28, 2011

(51) Int. Cl.
*G05F 5/00* (2006.01)
(52) U.S. Cl.
USPC .......................................................... 323/207
(58) Field of Classification Search .................. 323/207, 323/322, 323, 906; 363/71; 700/297
See application file for complete search history.

(56) References Cited

U.S. PATENT DOCUMENTS

| 7,573,160 B2 | 8/2009 | Cardinal et al. |
| 2007/0018510 A1* | 1/2007 | Cardinal et al. .............. 307/153 |
| 2010/0057267 A1* | 3/2010 | Liu et al. ....................... 700/297 |

* cited by examiner

*Primary Examiner* — Adolf Berhane
*Assistant Examiner* — Yemane Mehari
(74) *Attorney, Agent, or Firm* — Sutherland Asbill & Brennan LLP

(57) ABSTRACT

Certain embodiments of the invention may include systems and methods for regulating power in renewable energy sources. According to an exemplary embodiment of the invention, a method is provided for regulating active power produced by the renewable energy source towards an apparent power setpoint. The method may include selectively regulating voltage based on power factor foldback or voltage foldback associated with the renewable energy source. When power factor foldback is selected, the method may include regulating the power factor associated with the renewable energy source based at least in part on a power factor angle magnitude setpoint, and reducing the power factor angle magnitude setpoint towards zero when apparent power produced by the renewable energy source approaches or exceeds the apparent power setpoint. When voltage foldback is selected, the method may include regulating voltage of the renewable energy source based at least in part on measured VARs and an apparent power ratio, where the apparent power ratio is about equal to the apparent power divided by the apparent power setpoint.

23 Claims, 5 Drawing Sheets

SYSTEMS AND METHODS FOR REGULATING POWER IN RENEWABLE ENERGY SOURCES

FIELD OF THE INVENTION

This invention generally relates to renewable energy sources, and more particularly, to systems and method for regulating power in renewable energy sources.

BACKGROUND OF THE INVENTION

Renewable energy sources are designed to harvest power from naturally occurring energy sources including wind and sun. Multiple renewable energy sources can be combined in a "farm" to produce and supply electrical power to a grid. The amount of real, reactive, or apparent power produced by each of the renewable energy sources in the farm is a function of the voltage and current produced, and the phase relationship between the voltage and current. For example, when the current (I) and voltage (E) are in phase, real (active) power (P) is produced, and the number of watts produced can be expressed as the scalar multiplication of voltage and current: $P=I*E$. However, when the current and voltage are not in phase, reactive power (Q) is produced and the number of VARs (volts-amps reactive) produced can be expressed as $Q=E*I*\sin(\alpha)$, where $\alpha$ is the phase angle between the voltage and the current. The amount of real power produced when the voltage and current differ in phase may be expressed as $P=I*E*\cos(\alpha)$, where the $\cos(\alpha)$ is the power factor.

The vector sum of the real power P and reactive power Q is the apparent power (S), and in certain power generation systems, the apparent power may be monitored and utilized to regulate power production. However, control of the phase angle $\alpha$ or the power factor is desirable for maximizing the efficiency, and for keeping current and voltage within safe limits. A need remains for systems and methods for regulating power in renewable energy sources. A further need exists for systems and methods for controlling the power factor in renewable energy sources.

BRIEF SUMMARY OF THE INVENTION

Some or all of the above needs may be addressed by certain embodiments of the invention. Certain embodiments of the invention may include systems and methods for regulating power in renewable energy sources.

According to an exemplary embodiment of the invention, a method is provided for regulating active power produced by the renewable energy source towards an apparent power setpoint. The method may include selectively regulating voltage based on power factor foldback or voltage foldback associated with the renewable energy source. When power factor foldback is selected, the method may include regulating the power factor associated with the renewable energy source based at least in part on a power factor angle magnitude setpoint, and reducing the power factor angle magnitude setpoint towards zero when apparent power produced by the renewable energy source approaches or exceeds the apparent power setpoint. When voltage foldback is selected, the method may include regulating voltage of the renewable energy source based at least in part on measured VARS and an apparent power ratio, where the apparent power ratio is about equal to the apparent power divided by the apparent power setpoint.

According to another exemplary embodiment, a regulated renewable energy system is provided. The system may include one or more renewable energy sources having a combined output coupled to a utility grid, one or more measuring instruments configured to provide measurements of at least apparent power and power factor, and one or more computer processors. The computer processors are operable to regulate active power produced by the renewable energy source towards an apparent power setpoint, and select voltage regulation of power factor foldback or voltage foldback associated with the renewable energy source. When power factor foldback is selected, the computer processors are further operable to regulate the power factor of the renewable energy source based at least in part on a power factor angle magnitude setpoint, and reduce the power factor angle magnitude setpoint towards zero when apparent power produced by the renewable energy source approaches or exceeds the apparent power setpoint. When voltage foldback is selected, the computer processors are further operable to regulate voltage of the renewable energy source based at least in part on measured VARS and an apparent power ratio, where the apparent power ratio is about equal to the measured apparent power divided by the apparent power setpoint.

According to another exemplary embodiment, an apparatus is provided for controlling power produced by a solar energy source. The apparatus may include one or more measuring instruments configured to provide measurements of at least apparent power and power factor, and one or more computer processors operable to regulate active power produced by the solar energy source towards an apparent power setpoint and select voltage regulation of power factor foldback or voltage foldback associated with the solar energy source. When power factor foldback is selected, the one or more computer processors are further operable to regulate the power factor of the solar energy source based at least in part on a power factor angle magnitude setpoint, and reduce the power factor angle magnitude setpoint towards zero when apparent power produced by the solar energy source approaches or exceeds the apparent power setpoint. When voltage foldback is selected, the one or more computer processors are further operable to regulate voltage of the solar energy source based at least in part on measured VARS and an apparent power ratio, where the apparent power ratio is about equal to the measured apparent power divided by the apparent power setpoint.

Other embodiments and aspects of the invention are described in detail herein and are considered a part of the claimed invention. Other embodiments and aspects can be understood with reference to the following detailed description, accompanying drawings, and appended claims.

BRIEF DESCRIPTION OF THE FIGURES

Reference will now be made to the accompanying charts and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. The term "exemplary" as used throughout this document is defined to mean "example."

Certain embodiments of the invention may enable control of active and/or apparent power in renewable energy sources. Certain exemplary embodiments of the invention may enable power regulation of the renewable energy sources based on voltage. Other exemplary embodiments of the invention may enable power regulation of the renewable energy sources based on a power factor reference. According to exemplary embodiments of the invention, inputs to the system, including setpoints, limits, and mode selections, may be provided by a central controller or may be derived from measurements and/or external controllers.

According to embodiments of the invention, various system blocks may be used for measuring, controlling, and regulating power from the renewable energy sources. The system blocks will now be described with reference to the accompanying figures.

Figure 1:
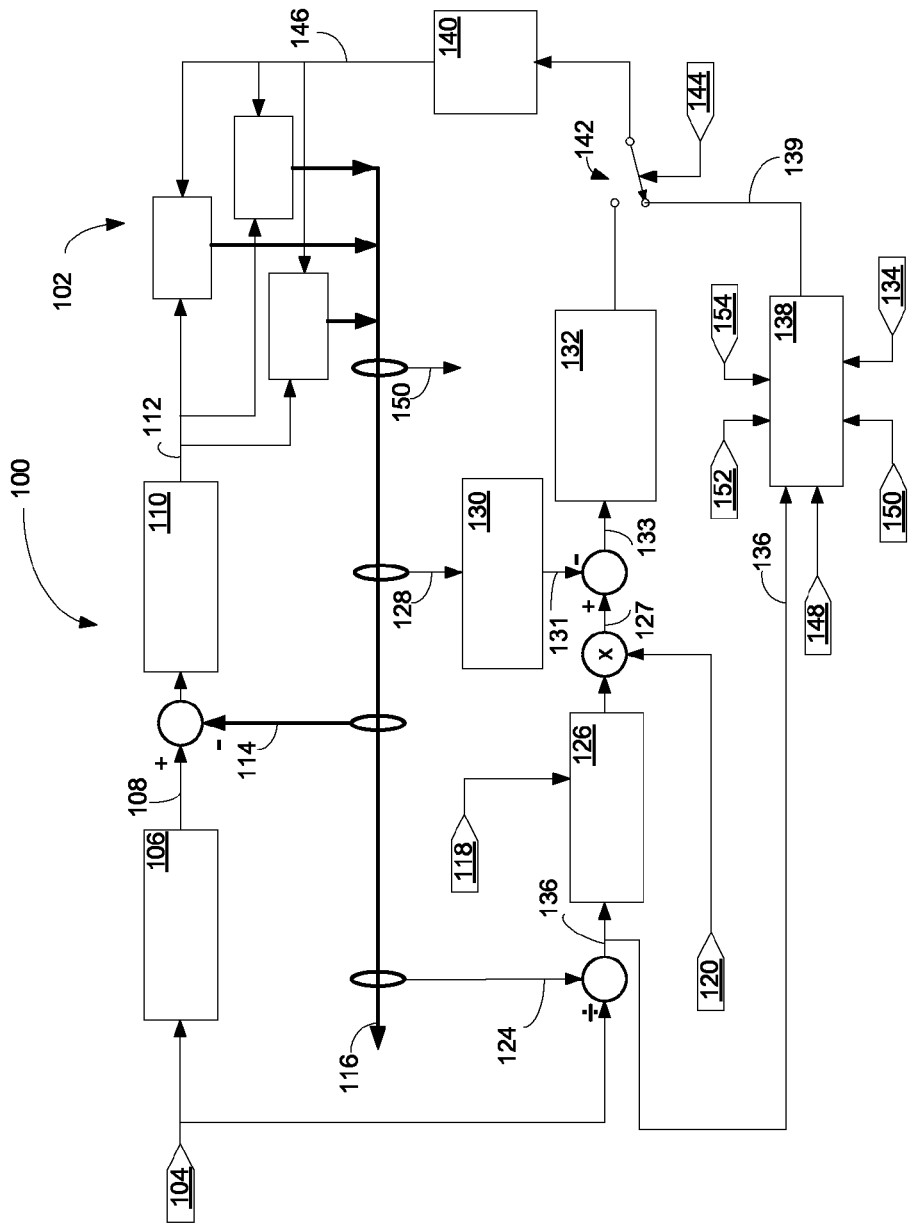
FIG. 1 is a block diagram of an illustrative renewable energy control system, according to an exemplary embodiment of the invention.

FIG. 1 illustrates an exemplary renewable energy control system 100. According to exemplary embodiments of the invention, the output power 116 generated by a plurality of renewable energy sources 102 may be measured and compared with various setpoints and limits to produce voltage command signals 146 via one or more feedback loops to control the voltage and power factor of the renewable energy sources 102. The renewable energy sources 102 may include wind and/or solar harvesting units with respective generators and inverters.

According to an exemplary embodiment of the invention, an apparent power setpoint 104 may be provided as an input to the system 100. A setpoint converter 106 may convert the apparent power setpoint to an active power command 108. The measured system power 114 may be subtracted from the active power command 108 to produce an error signal for input to a PI regulator 110, which may produce an active power command 112 for controlling the power output of the renewable energy sources 102. In some embodiments of the invention, the active power command 112 may comprise a plurality of commands configured to effect different changes in power output from each renewable energy source 102. The renewable energy sources 102 may also receive voltage command 146 signals. The combined active power command 112 and the voltage command 146 signals may be utilized to control the ratio of active and reactive power output from the renewable energy sources 102.

According to an exemplary embodiment of the invention, the voltage command 146 signal may be based either upon a power factor foldback 126 function or upon a voltage foldback 138 function depending upon the state of switch 142, where the state of switch 142 may be controlled by a mode select 144 input. In the case where the power factor foldback 126 is selected for controlling the voltage command 146, several inputs (104, 118, 120) and power measurements (124, 128) may be utilized by the various system blocks to set the voltage command 146 signal. According to an exemplary embodiment, measured apparent power 124 may be divided by an apparent power setpoint 104 to produce an apparent power ratio 136. According to exemplary embodiments of the invention, the power factor foldback 126 function may receive the apparent power ratio 136 and power factor foldback threshold 118 signals as inputs for reducing the power factor (i.e., reducing the produced VARs) when the apparent power ratio 136 is greater than the power factor foldback threshold 118.

According to exemplary embodiments of the invention, the system 100 output power 116 may be measured to determine a power factor 128 and the measured power factor 128 may be converted to a power factor angle 131 by a power factor-to-angle conversion 130 function. In addition, the output of the power factor foldback 126 function may be multiplied by a power factor angle magnitude setpoint 120 to produce a foldback angle 127. An angle error 133 signal may be derived by subtracting the power factor angle 131 from the foldback angle 127. The angle error 133 signal may be input to a power factor (angle) PI regulator 132. According to an exemplary embodiment, the output of the power factor (angle) PI regulator 132 may be selected by select switch 142, and may be utilized for input to a voltage PI regulator 140. The voltage PI regulator 140 may produce a voltage command 146 signal for controlling the voltage produced by the renewable energy sources 102.

According to exemplary embodiments of the invention, and in the case where voltage foldback 138 is selected for controlling the voltage command 146, several other inputs (104, 134, 148, 152, 154) and measurements (124, 150) may be utilized in conjunction with the voltage foldback 138 function to produce the voltage command 146 signal. According to an exemplary embodiment of the invention, the voltage foldback 138 (which will be further described below in reference to FIG. 2) may receive some or all of the following input signals: a voltage setpoint 134, an apparent power ratio 136 (as previously described), a voltage foldback threshold 148, measured VARs 150, a voltage low limit 152, and a voltage high limit 154. Based at least in part on these inputs, the voltage foldback 138 function may produce an output signal that may be selected by select switch 142, and may be utilized for input to a voltage PI regulator 140. The voltage PI regulator 140 may produce a voltage command 146 signal for controlling the voltage produced by the renewable energy sources 102.

Figure 2:
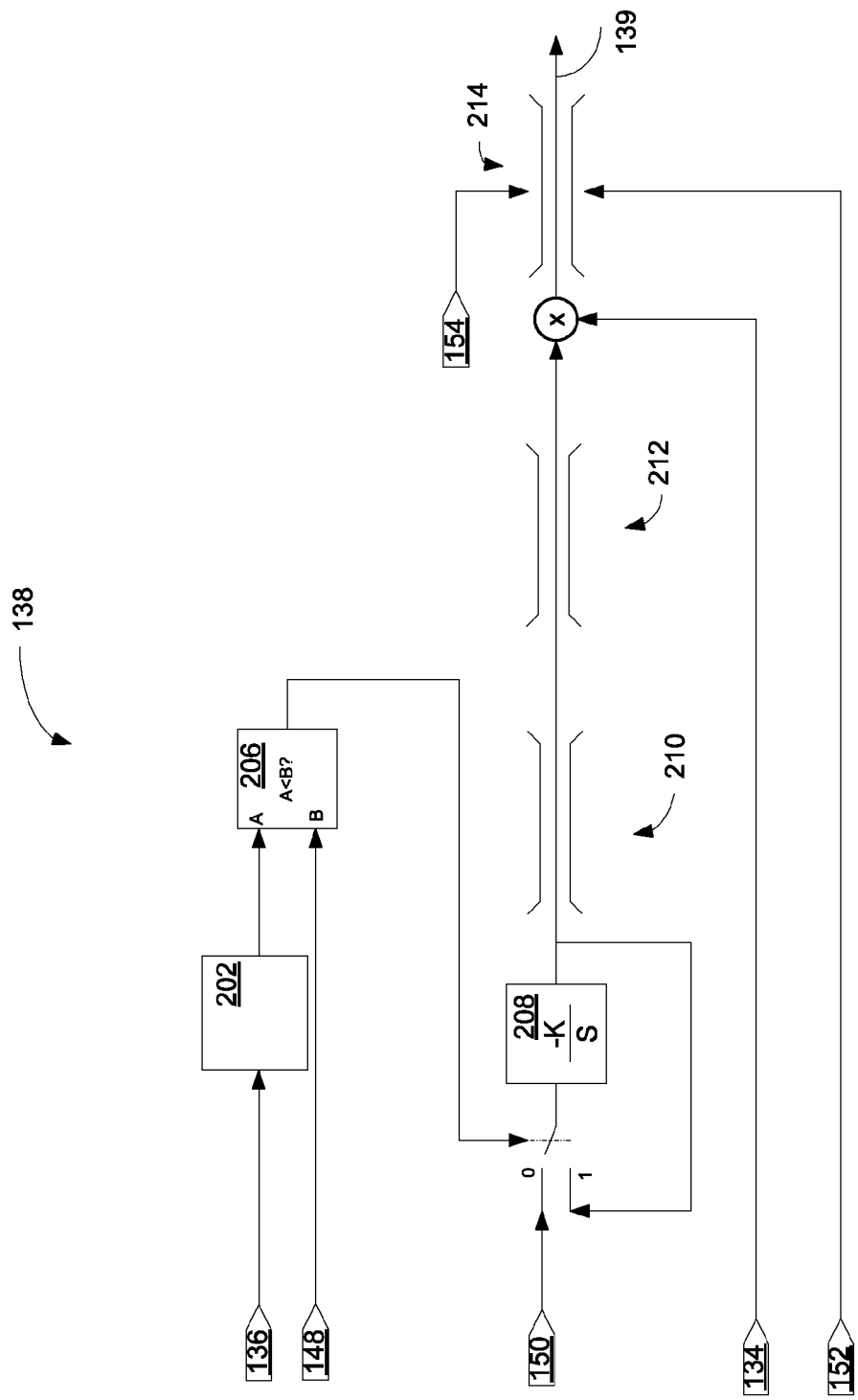
FIG. 2 is a block diagram of an illustrative voltage foldback subsystem according to an exemplary embodiment of the invention.

FIG. 2 depicts an exemplary embodiment of the voltage foldback 138 function. According to certain exemplary embodiments, apparent power 124 may be measured and divided by an apparent power setpoint 104 to produce an apparent power ratio 136. The apparent power ratio 136 may be input to the voltage foldback 138 function and may optionally be processed by a low pass filter 202. According to an exemplary embodiment, when the apparent power ratio 136 exceeds a foldback threshold 148, an integrator 208 using a negative gain may integrate the measured VARs 150 that the farm (102) is producing. According to exemplary embodiments, if the measured VARs 150 are positive, the integrator 208 may lower the voltage and reduce the VARs. If the VARs are negative, the integrator 208 may increase the voltage and increase the VARs. This has the effect of moving the VARs to zero which will allow more watts to be produced before exceeding the apparent power limit of the system. FIG. 2 also depicts three limiters (210, 212, 214) that may be present on the output of the integrator 208. The first limiter 210 may linearly scale the voltage output of the integrator 208 based on how close the measured apparent power 124 (Sactual) is to the apparent power setpoint 104 (Ssetpoint). In an example embodiment, the first limiter 210 may have an upper limit=Sactual/Ssetpoint−foldback threshold, and a lower limit=foldback threshold−Sactual/Ssetpoint. A second limiter 212 may limit the voltage output of the integrator 208 when the measured apparent power 124 is greater than the apparent power setpoint 104. In an example embodiment, when Sactual/Ssetpoint>1, the second limiter 212 may be clamped at an upper limit=1−foldback threshold 148, and a lower limit=foldback threshold 148−1. According to certain exemplary embodiments of the invention, the integrator 208 may also be clamped to the limits of the second limiter.

According to exemplary embodiments, a voltage setpoint 134 may multiply the output of the second limiter 212, and the resulting voltage reference 139 may be limited by a third limiter 214. The third limiter 214 may limit the voltage reference 139 produced by the voltage foldback 138 function to normal operational limits between the voltage low limit 152 and the voltage high limit 154. The voltage reference 139 may then be selected by select switch 142, and the voltage PI regulator 140 may then limit the power (watts) of the renewable energy sources 102 so that the apparent power setpoint 104 is not exceeded.

Figure 3:
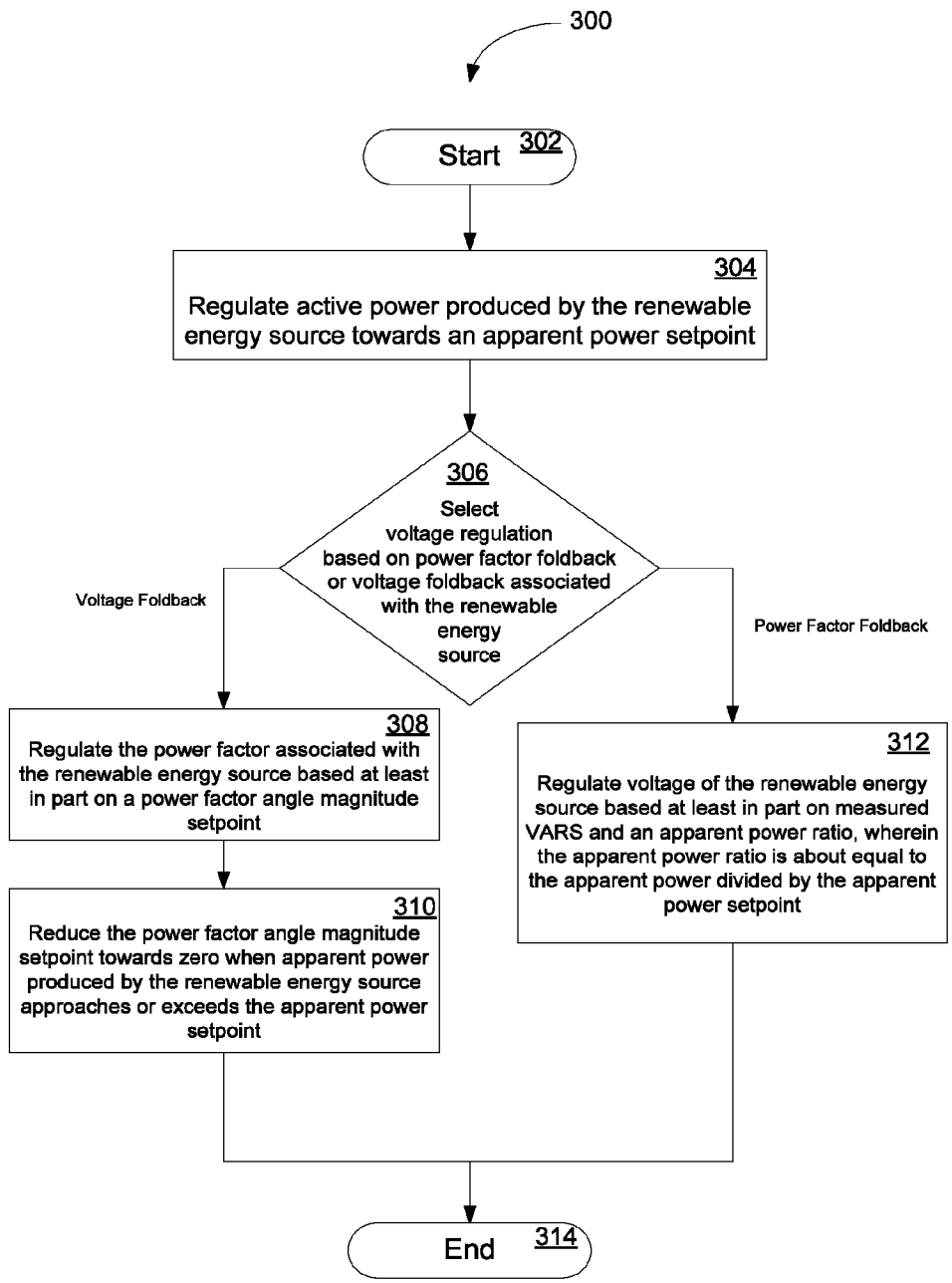
FIG. 3 is a flow diagram of an example method according to an exemplary embodiment of the invention.

An exemplary method 300 for controlling the power factor, power, and apparent power in renewable energy sources is described with reference to the flowdiagram of FIG. 3. The method 300 starts in block 302. In block 304 and according to an exemplary embodiment of the invention, the active power produced by the renewable energy source may be regulated towards an apparent power setpoint. In block 306, and according to an exemplary embodiment, a mode of voltage regulation may be selected based on power factor foldback or voltage foldback associated with the renewable energy source. If voltage foldback is selected as the mode of voltage regulation, then in block 308, and according to an exemplary embodiment, the power factor associated with the renewable energy source may be regulated based at least in part on a power factor angle magnitude setpoint, and in block 310, the power factor angle magnitude setpoint may be reduced towards zero when the apparent power produced by the renewable energy source approaches or exceeds the apparent power setpoint.

If power factor foldback is selected as the mode of voltage regulation, then in block 312, and according to an exemplary embodiment, the voltage of the renewable energy source may be regulated based at least in part on measured VARs and an apparent power ratio, where the apparent power ratio is about equal to the apparent power divided by the apparent power setpoint. The method 300 ends in block 314.

Figure 4:
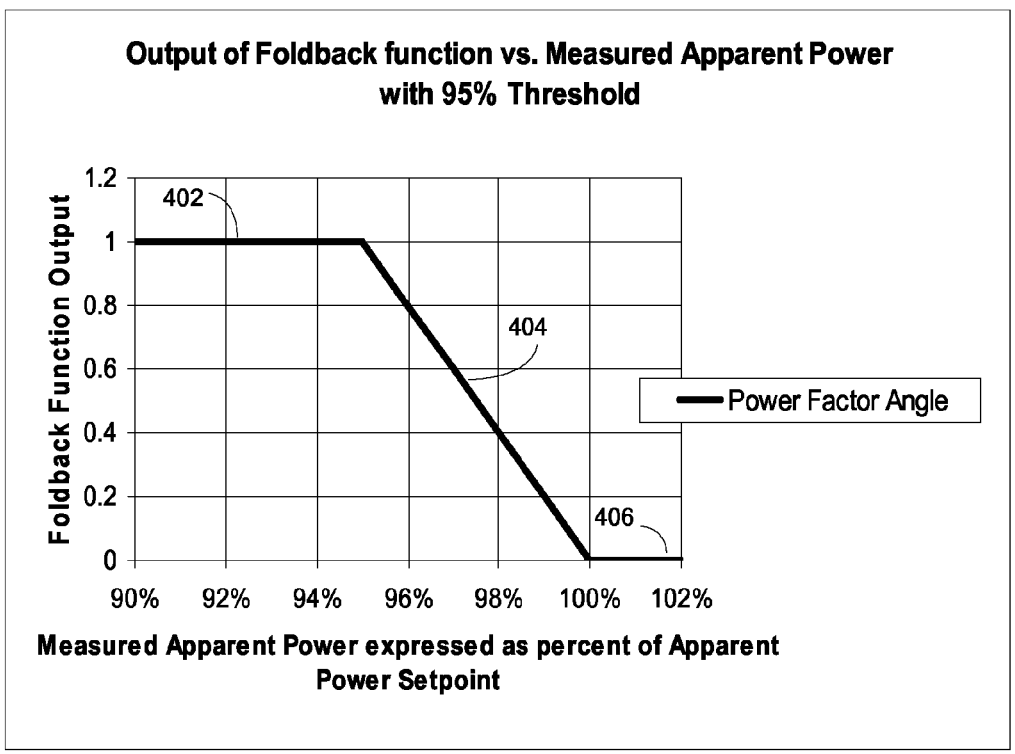
FIG. 4 is a chart representing example output of a foldback function according to an exemplary embodiment of the invention.

FIG. 4 depicts an exemplary graph of the foldback function (126, 138) outputs (y-axis), expressed as a function of the apparent power ratio 136 (x-axis), and for a foldback threshold (118, 148) set at 95%. According to an exemplary embodiment, when the apparent power ratio 136 is below the threshold (118, 148), the foldback function (126, 138) may not modify the power factor angle, and the foldback function output below threshold 402 may be steady. However, when the apparent power ratio 136 is at or above the threshold (118, 148), the foldback function (126, 138) may reduce the power factor angle, due to a decrease in the output of the foldback function above threshold 404. According to exemplary embodiments, if the apparent power ratio 136 is above unity 406, the foldback function (126, 138) may attempt to clamp the power factor angle at zero to reduce production of VARs.

Figure 5:
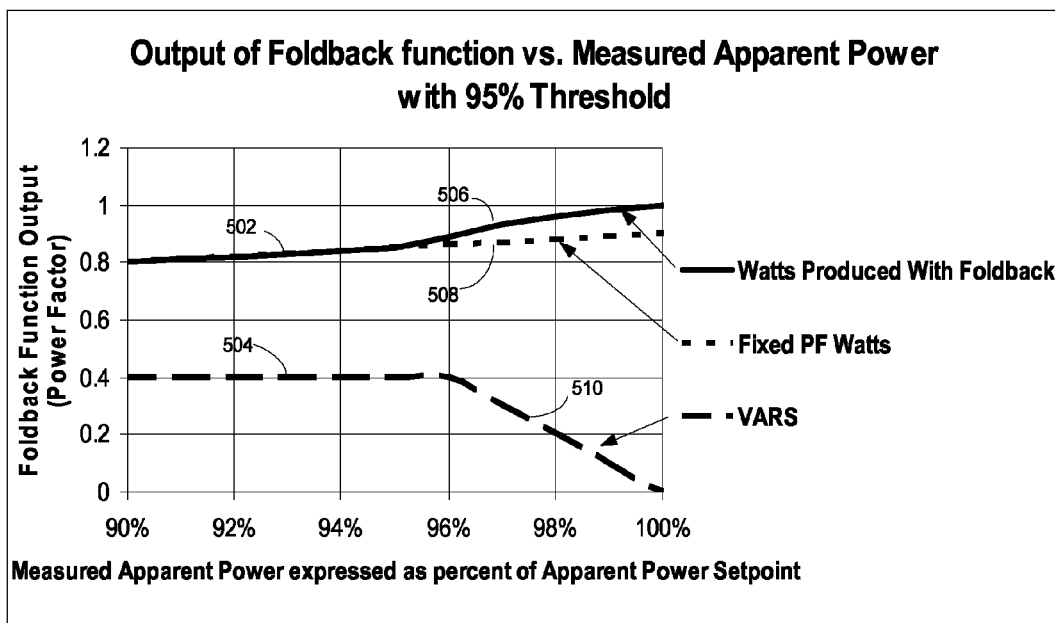
FIG. 5 is a chart representing example watts and VARs produced in relation to a foldback function according to an exemplary embodiment of the invention.

FIG. 5 depicts an exemplary graph of the real power (watts) and reactive power (VARs) produced by utilizing the foldback function (126, 138). As indicated above with reference to FIG. 4, when the apparent power ratio 136 is below the threshold (118, 148), the foldback function (126, 138) may not modify the power factor angle, and real power (watts) 502 may be produced along with reactive power (VARs) 504. However, when the apparent power ratio 136 is at or above the threshold (118, 148), the foldback function (126, 138) may reduce the power factor angle and the reactive power (VARs) 510 may be reduced, allowing an increase 506 in real power. FIG. 4 also depicts exemplary real power output produced with a fixed power factor 508.

Accordingly, certain exemplary embodiments of the invention can provide the technical effects of providing increased active power production from renewable energy sources 102. Certain exemplary embodiments of the invention can further provide the technical effects of adjusting VARs output of the renewable energy sources 102 based on either power factor foldback 126 or on voltage foldback 138.

In certain embodiments of the invention, the renewable energy control system 100 may include any number of software applications that are executed to facilitate any of the operations.

In certain embodiments, one or more input/output (I/O) interfaces may facilitate communication between the renewable energy control system 100, a central controller, and one or more I/O devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the renewable energy control system 100. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the renewable energy control system 100 and/or central or external controller inputs and outputs to one or more suitable networks and/or connections; for example, the connections that facilitate communications with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc., for communication with external devices and/or systems.

As desired, embodiments of the invention may include the renewable energy control system 100 with more or less of the components illustrated in FIGS. 1 and 2.

The invention is described above with reference to block and flow diagrams of systems, methods, apparatuses, and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for controlling power produced by a renewable energy source, the method comprising:
   regulating active power produced by the renewable energy source towards an apparent power setpoint;
   determining that a state of switch corresponds to a power factor foldback or a voltage foldback; and
   based on the determination, selectively regulating voltage based on the power factor foldback, the power factor being regulated based at least in part on a power factor angle magnitude setpoint, or based on the voltage foldback, the voltage being regulated based at least in part on measured volts-amps reactives (VARs) and an apparent power ratio, the apparent power ratio being about equal to an apparent power divided by the apparent power setpoint, wherein the power factor foldback and the voltage foldback are associated with the renewable energy source.

2. The method of claim 1, further comprising:
   when the power factor foldback is selected, regulating the power factor associated with the renewable energy source based at least in part on a power factor angle magnitude setpoint, and reducing the power factor angle magnitude setpoint towards zero when apparent power produced by the renewable energy source approaches or exceeds the apparent power setpoint; and
   when the voltage foldback is selected, regulating voltage of the renewable energy source based at least in part on measured VARs and an apparent power ratio, wherein the apparent power ratio is about equal to the apparent power divided by the apparent power setpoint.

3. The method of claim 2, wherein reducing the power factor angle magnitude setpoint towards zero further comprises folding back a power factor setpoint angle utilizing a foldback function based at least in part on measured apparent power, the apparent power setpoint, and a power factor foldback threshold.

4. The method of claim 3, wherein the foldback function is based at least in part on a ratio of measured apparent power to the apparent power setpoint, and wherein the foldback function reduces the power factor angle magnitude setpoint when the measured apparent power of the renewable energy source is greater than the apparent power setpoint.

5. The method of claim 2, wherein the power factor angle magnitude setpoint reduction is a monotonic decrease to zero and is clamped at zero when the measured apparent power reaches or exceeds the apparent power setpoint.

6. The method of claim 1, wherein regulating the voltage of the renewable energy source is based at least in part on a voltage foldback function, wherein the voltage foldback function regulates VARs of the renewable energy source by reducing the magnitude of VARs when the apparent power ratio approaches or exceeds a voltage foldback threshold.

7. The method of claim 6, wherein the voltage foldback threshold is between about 0.90 and about 0.99.

8. The method of claim 6, wherein VARs are regulated by regulating a voltage command signal and an active power command to the renewable energy source.

9. A regulated renewable energy system comprising:
   one or more renewable energy sources having a combined output coupled to a utility grid;
   one or more measuring instruments configured to provide measurements of at least apparent power and power factor; and
   one or more computer processors operable to:
      regulate active power produced by the renewable energy source towards an apparent power setpoint;
      determine that a state of switch corresponds to power factor foldback or voltage foldback; and
      based on the determination selectively regulate voltage based on the power factor foldback, the power factor being regulated based at least in part on a power factor angle magnitude setpoint, or based on the voltage foldback, the voltage being regulated based at least in part on measured volts-amps reactives (VARs) and an apparent power ratio, the apparent power ratio being about equal to an apparent power divided by the apparent power setpoint, wherein the power factor foldback and the voltage foldback are associated with the renewable energy source.

10. The system of claim 9, wherein the one or more computer processors are further operable to:
when power factor foldback is selected, regulate the power factor of the renewable energy source based at least in part on a power factor angle magnitude setpoint; and reduce the power factor angle magnitude setpoint towards zero when apparent power produced by the renewable energy source approaches or exceeds the apparent power setpoint; and
when voltage foldback is selected, regulate voltage of the renewable energy source based at least in part on measured VARs and an apparent power ratio, wherein the apparent power ratio is about equal to the measured apparent power divided by the apparent power setpoint.

11. The system of claim 10, wherein the one or more computer processors are further operable to reduce the power factor angle magnitude setpoint towards zero by folding back a power factor setpoint angle utilizing a foldback function based at least in part on measured apparent power, the apparent power setpoint, and a power factor foldback threshold.

12. The system of claim 11, wherein the voltage foldback function is operable to regulate VARs of the renewable energy source by reducing the magnitude of VARs when the apparent power ratio approaches or exceeds a voltage foldback threshold.

13. The system of claim 12, wherein the voltage foldback threshold is between about 0.90 and about 0.99.

14. The system of claim 10, wherein the foldback function is based at least in part on a ratio of measured apparent power to the apparent power setpoint, and wherein the foldback function reduces the power factor angle magnitude setpoint when the measured apparent power of the renewable energy source is greater than the apparent power setpoint.

15. The system of claim 10, wherein the one or more computer processors are further operable to reduce the power factor angle magnitude setpoint by monotonically decreasing the setpoint to zero and to clamp the setpoint at zero when the measured apparent power reaches or exceeds the apparent power setpoint.

16. The system of claim 10, wherein the one or more computer processors are further operable to regulate VARs by regulating a voltage command signal and an active power command to the renewable energy source.

17. An apparatus for controlling power produced by a solar energy source, the apparatus comprising:
one or more measuring instruments configured to provide measurements of at least apparent power and power factor; and,
one or more computer processors operable to:
regulate active power produced by the solar energy source towards an apparent power setpoint;
determine that a state of switch corresponds to power factor foldback or voltage foldback; and
based on the determination selectively regulating voltage based on the power factor foldback, the power factor being regulated based at least in part on a power factor angle magnitude setpoint, or based on the voltage foldback, the voltage being regulated based at least in part on measured volts-amps reactives (VARs) and an apparent power ratio, the apparent power ratio being about equal to an apparent power divided by the apparent power setpoint, wherein the power factor foldback and the voltage foldback are associated with the renewable energy source.

18. The apparatus of claim 17, wherein the one or more computer processors are further operable to:
when power factor foldback is selected, regulate the power factor of the renewable energy source based at least in part on a power factor angle magnitude setpoint; and reduce the power factor angle magnitude setpoint towards zero when apparent power produced by the renewable energy source approaches or exceeds the apparent power setpoint; and
when voltage foldback is selected, regulate voltage of the renewable energy source based at least in part on measured VARs and an apparent power ratio, wherein the apparent power ratio is about equal to the measured apparent power divided by the apparent power setpoint.

19. The apparatus of claim 18, wherein the one or more computer processors are further operable to reduce the power factor angle magnitude setpoint towards zero by folding back a power factor setpoint angle utilizing a foldback function based at least in part on measured apparent power, the apparent power setpoint, and a power factor foldback threshold.

20. The apparatus of claim 19, wherein the foldback function is based at least in part on a ratio of measured apparent power to the apparent power setpoint, and wherein the foldback function reduces the power factor angle magnitude setpoint when the measured apparent power of the renewable energy source is greater than the apparent power setpoint.

21. The apparatus of claim 18, wherein the one or more computer processors are further operable to reduce the power factor angle magnitude setpoint by monotonically decreasing the setpoint to zero and to clamp the setpoint at zero when the measured apparent power reaches or exceeds the apparent power setpoint.

22. The apparatus of claim 19, wherein the voltage foldback function is operable to regulate VARSs of the solar energy source by reducing the magnitude of VARs when the apparent power ratio approaches or exceeds a voltage foldback threshold.

23. The apparatus of claim 19, wherein the one or more computer processors are further operable to regulate VARs by regulating a voltage command signal and an active power command to the solar energy source.

* * * * *